United States Patent Office 3,780,197
Patented Dec. 18, 1973

3,780,197
BALANCED COFFEE FLAVORS
Arthur Stefanucci, Clifton, and Slawko Yadlowsky, Manville, N.J., assignors to General Foods Corporation, White Plains, N.Y.
No Drawing. Continuation-in-part of application Ser. No. 58,689, July 27, 1970, now Patent No. 3,700,462. This application Apr. 25, 1972, Ser. No. 247,496
The portion of the term of the patent subsequent to Oct. 24, 1989, has been disclaimed
Int. Cl. A23f 1/02
U.S. Cl. 426—473
26 Claims

ABSTRACT OF THE DISCLOSURE

High quality coffee is divided into portions and each portion roasted to a separate and discernible average roast color, the roasted portions are ground with at least one portion ground to a fine particle size; the ground high quality coffee is combined with low quality coffee ground to a coarse particle size to provide coffee products having either an improved flavor character by enhancing the flavor of the high quality coffee and/or by masking the undesirable flavor character of the low quality coffee, or to provide lower cost products.

REFERENCE TO PRIOR APPLICATIONS

This application is a continuation-in-part of U.S. Ser. No. 58,689, filed July 27, 1970, now U.S. Pat. 3,700,462, issued Oct. 24, 1972 (case 1713), by the same inventors.

BACKGROUND OF THE INVENTION

Field of the invention

The present invention relates to separate roasting and separate grinding of coffee and, more particularly to a method of enhancing or improving the flavor of high quality coffee and reducing undesirable flavor of low quality coffee.

Description of the prior art

Heretofore, various varieties of coffee and blends were roasted to a single "optimum" roast color. The "optimum" roast color is determined on the basis of consumer flavor preference for infusions prepared from the roasted coffee. The necessary roast color will vary depending on the variety or blend roasted but is fixed for a given variety or blend by that color which gains the widest consumer acceptance, taking into account factors of the cost of production, the type of market to which the product is directed, etc. In the past, improvements in cup flavor were obtained primarily by increasing the quantity of high quality coffee, generally from the coffee plant Coffee Arabica and, more particularly, Milds and Brazilian coffees and/or by reducing the quantity of low quality coffee, generally from the genus Robusta.

Further flavor improvements over roasting a blend to its optimum color were made by separately roasting each variety of coffee, intended for use in the blend, to its optimum roast color for imparting its characteristic flavor contribution to the blend, and then combining the separate roasts to produce an improved blend.

Evenly roasting the same type of coffee to different degrees and then blending the roasted beans has been suggested by Sivetz et al., Coffee Processing Technology, vol. 1, p. 239, AVI Publishing Co. (1963).

Our co-workers, Adler et al., Ser. No. 750,778, filed Aug. 7, 1968, have suggested grinding coffee to a fine particle size to increase its flavor contribution and grinding coffee to a coarse particle size to decrease its flavor contribution and combining the portions to form a roasted and ground blend having a greater content of Robusta coffee without an increase in undesirable flavor. This discovery is also the subject of U.S. Pat. No. 3,544,331, issued Dec. 1, 1970, to Hair et al.

In our previously filed application Ser. No. 58,689 we have taught that by separately roasting portions of high quality coffee to separate and discernible average roast color, each average roast color differing from the others by at least four color units and wherein at least one average roast color is higher and at least one average roast color is lower than the optimum roast color of the high quality coffee and then combining the roasts that a more balanced coffee flavor can be achieved by enhancing the desirable flavor characteristics of the high quality coffee and by reducing or eliminating the undesirable flavor characteristics of low cost coffee.

SUMMARY OF THE INVENTION

We have now discovered that when high quality coffee is divided in portions, each portion roasted to separate and discernible average roast colors and then ground either separately or as a blend to a predominantly fine particle size, a further improvement in flavor is possible. In blends containing low cost coffee separately ground to a predominantly coarse particle size, this allows improvement in flavor of the blend by enhancing the flavor of the high cost portions of the blend and/or allows an increase in low cost coffee content without apparent increase in objectionable flavor characteristics.

While Arabica coffees are generally high quality, there are certain Arabica's of low cost and quality. Similarly, while most Robusta is of low cost and quality, improvement in this variety is expected to lead to high quality coffee.

Unless otherwise indicated, low cost and low quality may be used interchangeably as may high cost and high quality.

In blends containing only Arabica coffee, separate roasting of portions of high quality Aribica to separate and distinct average roast colors and finer grinding of one or more of the average roast colors accentuates their flavor contribution while coarse grinding low cost Arabica reduces or masks their flavor contribution.

By roasting coffee Arabica or a blend containing coffee Arabica to a plurality of average roast colors and then combining the portions, a full flavor spectrum of the coffee is obtained. Roasting to a plurality of colors produces a better balanced cup flavor, more uniformity and consistency in product quality. The flavor impact of the Arabica coffee is further enhanced by adjusting the grinding conditions to produce a predominantly fine particle size to further accentuate desirable flavors. The flavor effect of low quality coffee combined with the Arabica coffee is reduced by coarse grinding.

The invention is particularly useful in treating high cost Arabica coffees, particularly those generally characterized in the trade as Milds, such as specific varieties exemplified by Medellin, Manizales, Coatepecs, Costa Ricas, Guatemalas, Armenians, wherein the roasting of separate portions and their combination after roasting produce a greater Milds flavor and cup strength. There is also developed more winey, aromatic and flavors all highly desirable in quality coffee. Furthermore, a stronger cup body produces higher flavor tolerance across recipe levels used by the consumer.

Treatment of Brazilian high quality Arabica coffees such as Santos, Paranas and the like results in a similar improvement in flavor for that variety of coffee treated, but not to the extent produced from the Milds coffees.

The invention is also applicable to low grade coffees for improving their flavor characteristics in two fashions: first, a light color roast of the low grade coffee, lighter in color than used for the high grade coffee, reduces objectionable flavors; and secondly, grinding to a coarse particle size further reduces objectionable flavors. When blended with varieties of high cost coffee treated by the process of this invention, there is formed a blend having improved quality flavor and reduced impact of undesirable low cost coffee flavors. Accordingly, blends containing both high grade and low grade coffees treated by the process of this invention have enhanced flavor impact, flavor characteristic of higher grade flavor and a diminished or eliminated undesirable flavor produced by the lower cost coffees in the blend. There is therefore attained a substantial improvement in flavor quality of a blend without the need to increase the quantity of higher quality or cost green coffees and/or to reduce the quantity of low cost coffees.

DETAILED DESCRIPTION OF THE INVENTION

This invention relates to first roasting high quality coffee in portions to separate and discernible average roast colors. One or more portions, or a combined blend, is then ground to a predominantly fine particle size to further develop desirable flavors and then is blended with low cost coffee, such as Robusta, which has been separately roasted and then ground to a coarse particle size to reduce or minimize the Robusta flavor of the final blend. The low cost coffee is preferably roasted to a lighter roast color than the high cost coffee to further reduce or minimize low-cost coffee flavor in the final blend. Of course this invention is equally applicable to preparing roasted and ground blends of 100% Arabica coffee by developing desired flavors and minimizing undesired flavors but is most applicable in forming blends containing large amounts of Robusta coffee generally at least 30% and preferably 35% or more of the finished roasted and ground coffee blend.

The process of this invention is particularly applicable to treating high cost Arabica coffees, either Milds or Brazilians, or combinations thereof. The high quality coffee treated may be either a single variety of Milds or Brazilian type, or may be a mixture of varieties of Milds and/or high quality Brazilians. For example, a single variety of a Milds type of coffee such as Manizales, Armenians or Medellins, or a mixture of all three, is divided into three portions. Each portion is then roasted to a separate and distinct roast color, namely, 45, 50 and 55. Each of the roasted portions have the following flavor characteristics when brewed or infused: the portion roasted to a 45 average roast color is characterized as winey, acid and aromatic; the portion roasted to a 50 average roast color is characterized as slightly winey, slightly aromatic and slightly woody; the portion roasted to a 55 average roast color is characterized as woody, having overall strong body and flavor balance. When the three separately roasted portions are combined, the flavor spectrum produced from the separate roasting is apparent. The combined blend gives a full flavor spectrum characteristic of Columbian coffees instead of the separate and discrete flavor obtained by roasting conventionally to a single optimum average roast color of 50. There is obtained a better balanced cup flavor, greater uniformity of flavor and greater consistency of product quality. The winey, aromatic and acid flavor notes are more apparent.

The flavor effect of the separate and discernible average roasts is further improved by controlling the particle size of the various fractions. For example, where more winey, acid and aromatic flavor is desired the 45 roast color fraction is ground to a fine particle size while one or more of the other fractions is ground to a normal or a coarse particle size to maintain or reduce its flavor contribution. Thus by coarse grinding the 55 roast color, the flavor of that fraction can be reduced.

The process of this invention also improves the flavor quality of a blend of coffee containing high cost or quality Arabica coffee varieties whether Milds, Brazilian or mixtures thereof.

The process of this invention is most useful for improving the flavor of a blend of coffee containing a substantial amount of low cost Robusta coffees.

The process of this invention is also applicable to decaffeinated green coffee whether a single variety is treated or a blend containing high quality coffees. A further embodiment is to fine grind organic solvent decaffeinated Arabica and coarse grind water decaffeinated Robusta, roasted by the process of this invention. (See co-pending U.S. application, Ser. No. 19,489, filed Mar. 13, 1970 by Fazzina et al., incorporated herein by reference.)

In practicing this invention, it is preferred to select the optimum color of the Arabica coffee and then roast portions of that coffee to separate and discernible average roast colors, each average roast color differing from the others by at least four color units and wherein at least one average roast color is higher and at least one average roast color is lower than the optimum roast color of the coffee Arabica. For example, if the optimum average roast color for a given variety is 55, the portions may be roasted to an average roast color of 50 to 60, or 50, 55 and 60. The same technique is employed in treating a blend.

In forming a blend of high cost coffee Arabica, such as a 100% Columbian blend, separate roasts are made as in the previous paragraph and are then ground separately to fine particle size for those roast fractions where it is desired to increase the flavor impact and to a coarse particle size where it is desired to diminish the flavor impact. The separately ground fractions are then preferably combined to have a particle size resembling conventional roasted and ground products. For example the 50 roast color is ground using a fine setting on a standard coffee mill while the 55 color is ground at a regular setting and the 60 color is ground on a coarse setting. In combining equal amount of the three portions there is produced a blend of roasted and ground coffee resembling a regular grind but having enhanced winey, acid and aromatic character with decreased woody character. Thus the process of this invention is applicable in treating either high cost coffees or in treating separately roasted high and low cost coffees.

A preferred embodiment of this invention is to improve the brewed flavor of a blend of coffee varieties containing low cost coffee from whatever source obtained, but particularly those low cost coffees of the genus Robusta. The high cost coffee Arabica of the ultimate blend are separately roasted to two, but preferably three, separate and distinct average roast colors, wherein at least one average roast color is higher and at least one average roast color is lower than the optimum roast color of the high cost coffee. The high cost roasts are then ground to a smaller than normal average particle size in order to further accentuate the quality flavor of the high cost coffee. This is done by several methods. Each of the separate roasts can be blended together and then the high cost blend ground to a finer or smaller than average particle size. This will accentuate the improved overall flavor of the roasted blend. Alternatively one or more of the separate roasts may be ground to finer than ordinary particle sizes. The degree of fineness to which the coffee is ground can be controlled to improve the strength characteristic of all the high grade coffee when brewed and to accentuate to any further degree the flavor contribution of certain of the separate roasts. For example the darker roast portion of a batch of Columbian coffee roasted to three distinct average roast colors can be ground more finely than the remaining two portions which are also ground more finely than normal. This technique not only improves the taste contribution of all the high cost Columbian coffee but accentuates the flavor effect of the darker roast portion achieving a more winey, acid and aromatic character in the brewed coffee. As is evident, it is possible to blend some or all of the separately roasted portions prior to grinding to a fine particle size.

The low cost coffee Robusta is roasted preferably to a color lighter than the color of any portion of the coffee Arabica roasts and then coarsely ground to a particle size usually larger than normal to reduce the flavor impact of the low cost coffee.

A preferred embodiment of this invention is to produce a blended roasted and ground coffee, having a particle size distribution, visual appearance and brew quality similar to normal, or ordinary roasted and ground coffee products. However, while it is preferred that the separately ground portions when blended give a particle size resembling that of conventional products on the market it is possible to produce new coffee products of distinct appearance provided only that the particle size of the high quality coffee is controlled to a size finer than the low cost coffee particle size effective to enhance the flavor impact of the high quality coffee. Normally the size of the low quality coffee is also controlled effective to decrease the flavor impact of the low quality coffee. Thus the low quality coffee could be flaked to give larger than ordinary particles while the high quality coffee were fine ground to produce a distinctive appearing product of improved high cost coffee flavor.

After reducing the whole bean to the desired particle size the high quality and low quality coffee is then blended. The blended product is either conventionally packaged as an improved regular coffee or can be extracted with water and dried by conventional means to prepare soluble coffee.

The effect of blending finely ground separate and distinct average roast colors of high quality coffee with coarsely ground light roasted low quality coffee is to improve the consumer acceptance of such a blend. Alternatively, the amount of low cost coffee employed in the blend may be increased without reducing the quality of the final roasted coffee blend when compared to blends roasted by conventional techniques.

For mixtures of coffee, whether all Arabica or a mixture of Arabica and Robusta, there are certain high quality coffee varieties or blends of varieties whose taste contribution is desirably increased and certain low cost coffees whose taste contribution is desirably decreased. As previously noted we have found that the taste contribution of high cost coffee, generally Arabica, can be improved by roasting any single variety or mixture of varieties to separate and discernible roast colors rather than employing a single optimum color. We have further found that when at least one of the separate roasts is ground more finely than normal a further improvement in high quality flavor is achieved. Conversely we have found that the flavor of poor quality coffee can be reduced, also improving quality, by grinding to a coarser than normal particle size.

We have found that the modification of particle size is easily accomplished using standard coffee mills, although obviously, other techniques can be employed. The change in grinding whether to a finer or coarser size is done to unbalance the normal size distribution of roasted and ground coffee. Normal coffee milling produces some fine and coarse particles with a large majority of intermediate coffee particles found between these extremes. By fine grinding separate roasts of high quality coffee a greater amount or a predominant amount of fine particles are produced with a corresponding reduction in intermediate particles. Hence, high quality coffee is more finely ground to produce a predominantly finer particle size. Conversely low cost coffee is coarsely ground to produce a predominantly coarser particle size. By a predominantly finer particle size we mean that as the coffee particles of a blend of varieties of coffee, including finely ground coffee, decrease in size, the weight fraction of the finer ground coffee particles to total particles increases for at least the intermediate range of particle size. By a predominantly coarser particle size we mean the converse of above; namely that the weight fraction of coarsely ground coffee particles increase with increasing particle size of the blend. Examples XB and XIB are illustrative of this. Note that the weight percentage of the finely ground Columbian coffee increase with increasingly finer blend particle size. Similarly note that the weight percentage of the coarsely ground Robusta coffee increases with increasingly coarser particle size.

Another convenient way of describing the change in particle size produced by this invention is to require that there be a minimum of 200 microns and preferably 300 microns difference in diameter between finely and coarsely ground particles at any equivalent weight fraction of the blend, at least for intermediate particle sizes or weight fractions from about 5% to above a major amount, say to 65% or greater. Hence, if the particle size of finely ground Columbian coffee and coarsely ground Robusta coffee reported in Examples XB and XIB is plotted, the difference in particle size or diameter at 10% weight fraction of each coffee is greater than 200 microns.

A preferred embodiment of this invention is to roast high quality coffee containing at least a major amount of Arabica coffee to two and preferably three separate and distint colors, separately grind one or more or a blend of the separate roasts to a predominantly finer particle size to further increase the roasts' taste contribution and blend the separate roasts with a low quality coffee, containing a major amount of Robusta coffee, roasted to a lighter roast color. Preferably a single variety or blend of high quality Columbian coffee is roasted to two, preferably three, separate and discernible average roast colors, each average roast color differing from the others by at least four color units and wherein at least one average roast color is higher or lighter and at least one average roast color is lower or darker than the optimum color of the Columbian coffee; the Columbian coffee is separately ground to a predominantly finer particle size to further enhance the flavor; the separately roasted and separately ground Columbian coffee is blended with Robusta coffee roasted to a higher or lighter color than any of the separate and discernible Columbian roasts and then separately ground to a predominantly coarser particle size to further reduce the Robusta coffees' taste contribution. A still further embodiment is to practice the separate roasting and grinding of high cost coffee on two general types of Arabica, namely Milds type and Brazilian type coffees, as in Examples IV, VI and IX and then separately grind at least one of the general types to a predominantly finer particle size to further enhance that type flavor contribution.

To obtain a noticeable flavor improvement or increase in the proportion of low cost coffee the ratio of fine high cost coffee particles to coarse low quality coffee particles should range from 1:3 to 3:1, preferably from 1:2 to 2:1.

If desired the particle size difference can be closely controlled by screening the ground coffee prior to blending. Overs can be reground and fines employed elsewhere or agglomerated by any conventional means. However, it is preferred to control particle size in the grinding step employing conventional mills. For example separate roasts of the Milds' portion of Arabica coffee can be combined and conventionally ground to a particle size typical of commercially produced drip ground roasted coffee. The remainder of the Arabica coffee can be ground to a particle size equivalent to regular grind and the Robusta coffee can be ground to a particle size equivalent to electric percolator grind coffee. The differences in particle size, due to using grind setting for drip, regular and electric percolators are sufficient, when the coffees are combined after grinding to produce a noticeable flavor improvement, while maintaining a grind size simulating regular grind.

Coffee treated by the process of this invention can be further processed to prepare soluble coffee having enhanced flavor characteristics. For example, high quality coffee may be treated by the process of this invention, namely roasted to multiple average roast colors, ground to develop the flavor characteristics desired, and extracted with water, using conventional techniques to produce a quality soluble coffee exhibiting greater impact of flavors characteristic of quality coffee than is obtained from conventional techniques employing the same coffee roasted to its optimum color.

Further improvement may be achieved by separately extracting low cost coffee ground to coarser than normal size and roasted to a lighter color than the Arabica, both steps further reducing the flavor impact of the low cost coffee. Further improvement is possible by freeze drying the Arabica portion and spray drying the low cost portion. However, in preparing soluble coffee by the method of this invention, it is preferred to roast Arabica to separate and discernible average roast colors, at least one being four units darker than the optimum and one being four units lighter than the optimum and to then fine grind the Arabica either as separate roasts or combined. This coffee is then mixed with Robusta coffee, roasted to a lighter color and coarsely ground to reduce the Robusta flavor effect. The combined fine and coarse fractions are then conventionally treated to obtain a soluble coffee. Preferably, the combined roasted and ground coffee particle size simulates the size conventionally employed in soluble coffee percolation. By combining the coffee prior to percolation, the coarse size particles act as support for the fine particles retaining them uniformly throughout the percolator columns, thus preventing pressure, foaming and other problems during the water extraction or percolation operation.

While it is preferred to separately roast Arabica and Robusta coffee, this invention may be applied to blends of coffee containing both Arabica and Robusta coffee. The blends should differ in coffee content such that one is of high quality or cost and one is of low quality and cost. Thus one may contain a major amount of predominantly high quality Arabica coffee while the other may contain a major amount of Robusta or other low cost coffee. The high quality blend is then treated as Arabica coffee while the low quality blend is treated as Robusta by the separate roasting and separate grinding techniques of this invention.

Separate and discernible average roast colors are those colors which when two roasted portions of coffee are compared visually by the ordinary consumer, there is detected a difference in color and when infused or brewed there is detected a difference in flavor. It has been found that the ordinary consumer can visually and organoleptically detect a difference of three or four color units. Color units refer to a system of color measurement which uses light reflectance as a measure of color.

The color of coffee is determined by grinding roasted coffee and screening it using U.S. No. 50 and pan. The portion that passes through U.S. No. 50 and is retained on the pan is collected, placed in a container of 1½" diameter and 1" deep and pressed under 1200 p.s.i., using a 1⅜" ram. The pressed coffee is placed beneath a photoelectric search unit of the color measuring device and the difference in reflected light at 959 mµ between a standard color plate and the coffee is indicated as color units on the scale of that instrument. When a slightly roasted coffee is placed beneath the search unit, the light reflectance is greater than the standard and the needle moves to a higher reading.

The color measuring device is a photoelectric reflection model 610 having a model y10-Y search unit, manufactured by Photovolt Company. The standard color plate employed is a ceramic plate of brown color and hue. The standard brown plate exhibits the following reflection curve using magnesium oxide to represent 100% reflection.

| Wave length: Reflectance mµ | Percent reflection Percent |
|---|---|
| 580 | 14.0 |
| 600 | 17.0 |
| 620 | 21.4 |
| 650 | 26.0 |
| 700 | 24.3 |

EXAMPLE I

A blend of coffee composed by weight of 30% Columbians, 40% Santos and 30% Robusta is prepared by conventionally and separately roasting the Columbians to a 60 roast color, the Santos to a 60 roast color, and the Robusta to an 85 roast color. The three roasts are blended, ground, and percolated. The blend impression or taste after percolation is characterized by a high Robusta or low grade cup flavor.

EXAMPLE II

Same as Example 1, except that Columbian coffee fraction is equally divided into two 15% fractions and roasted separately prior to blending with the separately roasted Santos and Robusta, i.e.

| | Amount, percent | Roast colors |
|---|---|---|
| Columbian | 30 | 55 and 65. |
| Santos | 40 | 60. |
| Robusta | 30 | 85. |

The blend impression after brewing produced a moderate Robusta flavor note.

EXAMPLE III

Same as Example I, except that the Columbian is divided in three 10% fractions as follows:

| | Amount, percent | Roast colors |
|---|---|---|
| Columbian | 30 | 50, 60, and 70. |
| Santos | 40 | 60. |
| Robusta | 30 | 85. |

The blend impression after brewing produced no detectable Robusta flavor note.

EXAMPLE IV

Same as Example I, except that the Columbian is divided into four equal 7.5% fractions as follows:

| | Amount, percent | Roast colors |
|---|---|---|
| Columbian | 30 | 45, 55, 65, and 75. |
| Santos | 40 | 50 or 60. |
| Robusta | 30 | 85. |

The blend impression after brewing produced no detectable Robusta flavor note.

EXAMPLE V

Same as Example I, except that the Santos is divided into equal 20% fractions as follows:

| | Amount, percent | Roast colors |
|---|---|---|
| Columbian | 30 | 60. |
| Santos | 40 | 60 and 70. |
| Robusta | 30 | 85. |

The blend impression after brewing produced a moderate Robusta flavor note.

EXAMPLE VI

Same as Example I, except that the Columbian is divided into equal 15% fractions and the Santos is divided into equal 20% fractions as follows:

| | Amount, percent | Roast colors |
|---|---|---|
| Columbian | 30 | 60 and 70. |
| Santos | 40 | Do. |
| Robusta | 30 | 85. |

The blend impression after brewing produced a moderate Robusta flavor note.

EXAMPLE VII

Same as Example I, except that the Santos is divided into three equal 13.3% fractions as follows:

| | Amount, percent | Roast colors |
|---|---|---|
| Columbian | 30 | 60. |
| Santos | 40 | 55, 65 and 75. |
| Robusta | 30 | 85. |

The blend impression after brewing produced no detectable Robusta flavor note.

EXAMPLE VIII

Same as Example I, except that the Santos was divided into four equal 15% fractions as follows:

| | Amount, percent | Roast colors |
|---|---|---|
| Columbian | 30 | 60. |
| Santos | 40 | 50, 60, 70, and 80. |
| Robusta | 30 | 85. |

The blend impression after brewing produced no detectable Robusta flavor note.

EXAMPLE IX

Same as Example I, except that the Columbian was divided into four equal 7.5% fractions and the Santos was divided into four equal 10% fractions as follows:

| | Amount, percent | Roast colors |
|---|---|---|
| Columbian | 30 | 45, 55, 65, and 75. |
| Santos | 40 | 50, 60, 70, and 80. |
| Robusta | 30 | 85. |

The blend impression after brewing produced very slightly detectable Robusta flavor note.

EXAMPLE X

Example X, Part A, is same as Example II, except a different chop of green coffee is used. The Columbian coffee is divided equally into two 15% fractions and each fraction is roasted separately to the average roast colors indicated and blended with separately roasted Brazilian and Robusta coffee. The blend is ground using a regular grind setting on a standard Hobart coffee mill. Example X, Part B, is the same as X, Part A, except that after separate roasting the Columbian coffee is combined and separately ground using a mill setting to give the required drip grind; the Brazilian coffee is separately ground to a regular grind and the Robusta coffee is separately ground at a coarser setting, corresponding to an electric percolator grind. The separately ground fractions are then combined to give a roasted and ground coffee with the appearance of regular grind coffee. The following table summarizes the processing conditions and physical properties of the coffee:

EXAMPLE X

| | Amount, percent | Average roast color | Grinder setting (Hobart mill) | On Tyler | Sieve analysis (weight-gms. and percent on screen) | | | | | | Total screens and pan |
|---|---|---|---|---|---|---|---|---|---|---|---|
| | | | | | 10 | 14 | 20 | 28 | 35 | Pan | |
| Coffee: | | | | | | | | | | | |
| X-A: | | | | | | | | | | | |
| Columbian | 15 | 55 | Regular | | 1.2 | 20.0 | 42.1 | 20.6 | 5.4 | 10.6 | 99.9 |
| | 15 | 65 | | | | | | | | | |
| Brazilian | 40 | 60 | | | | | | | | | |
| Robusta | 30 | 85 | | | | | | | | | |
| X-B: | | | | | | | | | | | |
| Columbian | 15 | 55 | Drip | | 0.1 | 3.0 | 10.5 | 8.9 | 2.5 | 5.0 | 30.0 |
| | 15 | 65 | | | (14.3) | (17.6) | (25.4) | (37.8) | (36.8) | (45.8) | (30) |
| Brazilian | 40 | 60 | Regular | | 0.2 | 6.3 | 17.8 | 9.2 | 3.0 | 3.8 | 40.3 |
| | | | | | (28.6) | (36.8) | (43.1) | (39.2) | (44.1) | (34.9) | (40) |
| Robusta | 30 | 85 | Electric percolator | | 0.4 | 7.8 | 13.0 | 5.4 | 1.3 | 2.1 | 30.0 |
| | | | | | (57.1) | (45.6) | (31.5) | (23.0) | (19.1) | (19.3) | (30) |
| Total when coffee is separately screened | | | | | 0.7 | 17.1 | 41.3 | 23.5 | 6.8 | 10.9 | 100.3 |
| | | | | | (100.0) | (100.0) | (100.0) | (100.0) | (100.0) | (100.0) | (100) |
| Total when coffee is combined, mixed and screened | | | | | 0.9 | 18.6 | 40.7 | 22.5 | 11.0 | 5.1 | 98.8 |
| Regular grind target | | | | | 1.0 | 14.0 | 43.0 | 24.0 | 10.0 | 8.0 | 100.0 |

NOTE.—Figures in parenthesis indicates calculated percent on a given Tyler.

An expert panel evaluation of coffee prepared as in X-A and X-B indicated a preference of 6.0 and 6.4 for the samples respectively, (0–10) scale with the control (X-A) found to be heavy, slightly harsh, earthy with moderate acidity.

The varient, X-B, was preferred as milder and more acid, less earthy, slightly winey and slightly harsh.

EXAMPLE XI

Example XI, Part A, is same as Example III except the same chop of green coffee is used as in Example X. The Columbian coffee is divided into three equal 10% fractions, each fraction of coffee is roasted separately to the average roast colors indicated and blended with separately roasted Brazilian and Robusta coffee roasted to the colors indicated. The blend is ground using a regular grind setting as in Example X-A.

Example XI, Part B, uses 5% less Columbian and Brazilian coffee and 10% more Robusta coffee.

The coffee is roasted separately to the colors indicated. The Columbian roasted whole bean is combined and ground to a drip grind. The Brazilian roasted coffee is separately ground to a Regular grind; while the Robusta is separately ground to an Electric Percolator setting. The separately ground fractions are then combined to give a roasted and ground blend having the appearance of regular grind coffee. The following table summarizes the processing conditions and physical properties of the coffee:

EXAMPLE XI

| | Amount, percent | Average roast color | Grinder setting (Hobart mill) | On Tyler | Sieve analysis (weight-gms. and percent on screen) | | | | | | Total screens and pan |
|---|---|---|---|---|---|---|---|---|---|---|---|
| | | | | | 10 | 14 | 20 | 28 | 35 | Pan | |
| Coffee: | | | | | | | | | | | |
| XI-A: | | | | | | | | | | | |
| Columbian | 10 | 50 | Regular | | 0.6 | 15.3 | 45.2 | 21.3 | 12.8 | 4.0 | 99.2 |
| | 10 | 60 | | | | | | | | | |
| | 10 | 70 | | | | | | | | | |
| Brazilian Santos | 40 | 60 | | | | | | | | | |
| Robusta | 30 | 85 | | | | | | | | | |
| XI-B: | | | | | | | | | | | |
| Columbian | 10 | 50 | Drip | | 0.1 | 2.5 | 8.8 | 7.4 | 2.2 | 4.2 | 25.2 |
| | 10 | 60 | | | (11.1) | (13.6) | (21.0) | (32.8) | (32.8) | (40.8) | (25) |
| | 5 | 70 | | | | | | | | | |
| Brazilian | 35 | 60 | Regular | | 0.2 | 5.5 | 15.6 | 8.0 | 2.7 | 3.3 | 35.3 |
| | | | | | (22.2) | (29.9) | (37.4) | (35.4) | (40.4) | (32.0) | (35) |
| Robusta | 40 | 85 | Electra-Perk | | 0.6 | 10.4 | 17.4 | 7.2 | 1.8 | 2.8 | 40.2 |
| | | | | | (66.7) | (56.5) | (41.6) | (31.8) | (26.8) | (27.2) | (40) |
| Total when coffee separately screened. | | | | | 0.9 | 18.4 | 41.8 | 22.6 | 6.7 | 10.3 | 100.7 |
| | | | | | (100.0) | (100.0) | (100.0) | (100.0) | (100.0) | (100.0) | (100) |
| Total when coffee combined, mixed and screened. | | | | | 0.8 | 15.3 | 44.1 | 22.8 | 6.7 | 10.0 | 99.7 |
| Regular grind target | | | | | 1.0 | 14.0 | 43.0 | 24.0 | 10.0 | 8.0 | 100 |

NOTE.—Figures in parenthesis indicates calculated percent on a given Tyler.

An expert panel evaluation of the coffee prepared in XI-A and XI-B, indicated a preference of 6.0 and 6.6 respectively (0-10 scale) with the varient XI-B preferred as more aromatic, heavier bodied, less harsh and milder with a slight winey flavor. The control XI-A was characterized as light in body, slightly aromatic, woody, slightly earthy and harsh.

Both of separately roasted and separately ground Arabica varients (X-B and XI-B) were found by the panel to be improved in quality with more Milds character than the controls (X-A and XI-A) blended prior to grinding.

A complete compilation of the examples is as follows:

| | Blend flavor impression | | |
|---|---|---|---|
| | Columbian | Santos | Robusta |
| Example: | | | |
| I | Very slight | Slight | High. |
| II | Moderate | Moderate | Moderate. |
| III | High | do | None. |
| IV | Moderate | do | Do. |
| V | High | Slight | Moderate. |
| VI | do | Moderate | Do. |
| VII | do | Slight | None. |
| VIII | do | Moderate | Do. |
| IX | do | do | Very slight. |
| X-A | Moderate | do | Moderate. |
| X-B | do | do | Slight. |
| XI-A | do | do | Do. |
| XI-B | High | do | Do. |

It will be understood that while the invention has been described with reference to the above examples, the inventive concept is not limited thereto.

What is claimed is:

1. A process for obtaining a coffee product comprising:
   (a) dividing high cost whole bean coffee into portions;
   (b) roasting the portions to a plurality of separate and discernible average roast colors wherein at least one average roast color is higher and at least one average roast color is lower than the optimum roast color of the coffee;
   (c) reducing the roasted bean portions to a particle size suitable for extraction, at least one portion of the high cost coffee being separately reduced to a predominantly finer particle size effective to increase said portion's quality taste contribution; and
   (d) combining the ground roasted portions.

2. The process of claim 1 which further includes reducing at least one portion to a predominantly coarser particle size effective to diminish that portion's taste contribution.

3. The process of claim 1 in which the high cost coffee is coffee Arabica.

4. The process of claim 1 in which the high cost coffee is a Milds-type coffee.

5. The process of claim 1 in which the high cost coffee is a Brazilian-type coffee.

6. The process of claim 1 which further includes extracting the combined ground roasted portions to provide a soluble coffee product.

7. The process of claim 1 in which the high cost coffee is a decaffeinated coffee.

8. The process of claim 1 in which each separate and discernible average roast color differs from the others by at least four color units; and wherein at least one average roast color is higher and at least one average roast color is lower than the optimum roast color of the high cost coffee.

9. The process of claim 8 which further includes a second high cost or high quality coffee Arabica roasted to separate and discernible average roast colors, each average roast color differing from the others by at least four color units and wherein at least one average roast color is higher and one average roast color is lower than the optimum roast color of the coffee.

10. The process of claim 9 wherein one high cost coffee is Milds and the second high cost coffee is high quality Brazilians.

11. The process of claim 9 in which at least one high quality coffee is roasted to at least three separate and discernible roast colors.

12. The process of claim 8 in which the separately ground high cost coffee is blended with a low cost coffee, reduced to a predominently coarser particle size effective to decrease said low cost coffees' taste contribution.

13. The process of claim 12 which further includes extracting the roasted coffee to produce a soluble coffee product.

14. The process of claim 12 in which the low cost coffee is separately roasted to a color lighter than the roast color of any of the high cost coffee portions.

15. The process of claim 14 in which the low cost coffee is Robusta.

16. The process of claim 14 in which the high cost coffee is Arabica.

17. The process of claim 14 in which the high cost coffee is Milds coffee.

18. The process of claim 14 in which the high cost coffee is Brazilian coffee.

19. The process of claim 14 in which each separate and discernible roast color differs by at least eight color units.

20. The process of claim 14 in which the coffee is roasted to at least three separate and discernible average roast colors.

21. The process of claim 20 in which the high cost or high quality coffee is a Milds-type coffee.

22. The process of claim 20 in which the high cost or high quality coffee is a high quality Brazilian coffee.

23. The process of claim 20 in which the coffee is a single variety of Milds or high quality Brazilian coffee.

24. The process of claim 20 in which one of the separate and discernible roasts is the coffees' optimum roast color.

25. The process of claim 20 in which the coffee is combined with conventional roasts of other varieties of coffee.

26. The process of claim 20 in which the low cost coffee includes Robusta coffee and the less desirable flavor characteristics of the Robustas are substantially eliminated.

References Cited

UNITED STATES PATENTS 3,700,462   10/1972   Stefanucci et al. _____ 99—68
3,544,331   12/1970   Hair _____ 99—68

FRANK W. LUTTER, Primary Examiner

W. L. MENTLIK, Assistant Examiner

U.S. Cl. X.R.

426—263, 388